US007282555B2

(12) United States Patent
Weaver et al.

(10) Patent No.: US 7,282,555 B2
(45) Date of Patent: Oct. 16, 2007

(54) METHOD FOR INCORPORATING NITROGEN CONTAINING METHINE LIGHT ABSORBERS IN PET AND COMPOSITIONS THEREOF

(75) Inventors: Max Allen Weaver, Kingsport, TN (US); Jason Clay Pearson, Kingsport, TN (US); Dale Milton Blakely, Kingsport, TN (US); Frederick Leslie Colhoun, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 181 days.

(21) Appl. No.: 10/855,919

(22) Filed: May 27, 2004

(65) Prior Publication Data

US 2005/0267284 A1    Dec. 1, 2005

(51) Int. Cl.
C08G 63/02 (2006.01)
(52) U.S. Cl. ...................... 528/272; 524/706; 524/783; 524/784; 524/785; 528/275; 528/279; 528/280; 528/281; 528/283; 528/285; 528/286; 528/289; 528/290; 528/291; 528/292; 528/298; 528/300; 528/302; 528/307; 528/308; 528/308.6
(58) Field of Classification Search ............... 528/275, 528/279, 280, 281, 283, 285, 286, 289, 290, 528/291, 292, 298, 300, 302, 307, 308, 308.6; 524/706, 783, 784, 785; 502/150
See application file for complete search history.

(56) References Cited

U.S. PATENT DOCUMENTS

| | | | |
|---|---|---|---|
| 4,617,373 A | | 10/1986 | Pruett et al. |
| 4,617,374 A | | 10/1986 | Pruett et al. |
| 4,617,942 A | * | 10/1986 | Garner ................. 460/112 |
| 4,661,566 A | | 4/1987 | Pruett et al. |
| 4,778,708 A | | 10/1988 | Nishino et al. |
| 4,820,795 A | | 4/1989 | Hirata et al. |
| 4,826,903 A | | 5/1989 | Weaver et al. |
| 4,981,516 A | | 1/1991 | Kluger et al. |
| 5,030,708 A | | 7/1991 | Krutak et al. |
| 5,064,935 A | | 11/1991 | Jackson et al. |
| 5,106,942 A | * | 4/1992 | Krutak et al. ............. 528/272 |
| 5,215,876 A | | 6/1993 | Pruett et al. |
| 5,238,975 A | | 8/1993 | Johnson et al. |
| 5,254,288 A | | 10/1993 | Verheijen et al. |
| 5,274,072 A | | 12/1993 | Weaver et al. |
| 5,286,836 A | | 2/1994 | Park et al. |
| 5,322,883 A | | 6/1994 | Adyha et al. |
| 5,331,066 A | | 7/1994 | Takanoo et al. |
| 5,368,968 A | | 11/1994 | Wehrmann et al. |
| 5,376,650 A | * | 12/1994 | Weaver et al. ............. 525/154 |
| 5,382,474 A | | 1/1995 | Adhya et al. |
| 5,401,438 A | | 3/1995 | Otsuka |
| 5,419,936 A | | 5/1995 | Tindale |
| 5,453,479 A | | 9/1995 | Borman et al. |
| 5,456,725 A | | 10/1995 | Bruhnke |
| 5,459,224 A | | 10/1995 | Pruett et al. |
| 5,523,381 A | | 6/1996 | Ueberdiek et al. |
| 5,532,332 A | | 7/1996 | Weaver et al. |
| 5,681,918 A | | 10/1997 | Adams et al. |
| 5,714,262 A | | 2/1998 | Stouffer et al. |
| 5,753,190 A | | 5/1998 | Haseltine et al. |
| 5,854,377 A | | 12/1998 | Braune |
| 5,981,690 A | | 11/1999 | Lustig et al. |
| 5,985,389 A | | 11/1999 | Dalton et al. |
| 6,001,952 A | | 12/1999 | Carman et al. |
| 6,020,421 A | | 2/2000 | Fukushima et al. |
| 6,099,778 A | | 8/2000 | Nelson et al. |
| 6,100,369 A | | 8/2000 | Miyajima et al. |
| 6,200,659 B1 | | 3/2001 | Fujimori et al. |
| 6,207,740 B1 | | 3/2001 | Zhao et al. |
| 6,265,533 B1 | | 7/2001 | Regel et al. |
| 6,277,947 B1 | | 8/2001 | Kelsey et al. |
| 6,300,462 B1 | | 10/2001 | Cliffton et al. |
| 6,316,584 B1 | | 11/2001 | Seidel et al. |
| 6,350,851 B1 | | 2/2002 | Inada et al. |
| 6,417,320 B1 | | 7/2002 | Otto et al. |
| 6,506,853 B2 | | 1/2003 | Duan |
| 6,541,598 B2 | | 4/2003 | Duan et al. |
| 6,559,216 B1 | | 5/2003 | Zhao et al. |
| 6,569,991 B2 | | 5/2003 | Nichols et al. |
| 6,590,069 B2 | | 7/2003 | Nichols et al. |
| 6,599,596 B2 | | 7/2003 | Nichols et al. |

(Continued)

OTHER PUBLICATIONS

Copending application filed on even date herewith "Process For Adding Nitrogen Containing Methine Light Absorbers To Poly(ethylene Terephthalate)".

*Primary Examiner*—Terressa Boykin
(74) *Attorney, Agent, or Firm*—Bernard J. Graves, Jr.; Dennis V. Carmen

(57) ABSTRACT

The present invention is a method for efficiently incorporating a nitrogen containing methine light absorber into a polyester resin. The method includes forming a reaction mixture comprising combining a diol component, a diacid component selected from the group consisting of dicarboxylic acids, dicarboxylic acid derivatives, and mixtures thereof, an antimony containing compound, a phosphorus containing compound, a metal containing compound, and a nitrogen containing methine light absorber. The reaction mixture is polymerized in a polycondensation reaction system. In another embodiment the light absorber is added while the reaction products of one reactor are being transferred to the next reactor in the polycondensation reaction system. The present invention is also directed articles made from the polyester resin.

39 Claims, No Drawings

U.S. PATENT DOCUMENTS

| | | |
|---|---|---|
| 6,604,848 B2 | 8/2003 | Tanaka et al. |
| 6,703,474 B2 | 3/2004 | Fujimori et al. |
| 6,716,898 B2 | 4/2004 | Weaver et al. |
| 6,720,382 B2 | 4/2004 | Leugs et al. |
| 6,723,826 B2 | 4/2004 | Yamaguchi et al. |
| 6,780,916 B2 | 8/2004 | Tung et al. |
| 6,787,589 B2 * | 9/2004 | Weaver et al. ............... 523/508 |
| 6,803,082 B2 | 10/2004 | Nichols et al. |
| 6,841,604 B2 | 1/2005 | Bayer et al. |
| 6,852,388 B2 | 2/2005 | Murschall et al. |
| 2002/0010310 A1 | 1/2002 | Allen et al. |
| 2002/0137879 A1 | 9/2002 | Ohmatsuzawa et al. |
| 2003/0045672 A1 | 3/2003 | Duan et al. |
| 2003/0144459 A1 | 7/2003 | Fujimori et al. |
| 2004/0236063 A1 | 11/2004 | Suzuki et al. |
| 2004/0236065 A1 | 11/2004 | Denis et al. |

* cited by examiner

METHOD FOR INCORPORATING NITROGEN CONTAINING METHINE LIGHT ABSORBERS IN PET AND COMPOSITIONS THEREOF

BACKGROUND OF THE INVENTION

1. Field of the Invention

The present invention relates to a method for efficiently incorporating light absorbing compounds into a polyester composition. More particularly, the present method relates to incorporating a nitrogen containing methine light absorbing compound into a polyester composition.

2. Background Art

Polyester is a polymeric resin widely used in a number of packaging and fiber based applications. Poly(ethylene terephthalate) ("PET") or a modified PET is the polymer of choice for making beverage and food containers such as plastic bottles and jars used for carbonated beverages, water, juices, foods, detergents, cosmetics, and other products.

In the typical polyester forming polycondensation reaction, a diol such as ethylene glycol is reacted with a dicarboxylic acid or a dicarboxylic acid ester. The reaction is accelerated by the addition of a suitable reaction catalyst. Since the product of the polyester condensation reaction tends to be reversible and in order to increase the molecular weight of the polyesters, this reaction is often carried out in a multi-chamber polycondensation reaction system having several reaction chambers operating in series. Typically, the diol and the dicarboxylic acid component are introduced in the first reactor at a relatively high pressure. After polymerizing at an elevated temperature the resulting polymer is then transferred to the second reaction chamber which is operated at a lower pressure than the first chamber. The polymer continues to grow in this second chamber with volatile compounds being removed. This process is repeated successively for each reactor, each of which are operated at lower and lower pressures. The result of this step wise condensation is the formation of polyester with higher molecular weight and higher inherent viscosity.

During the polycondensation process, various additives such as colorants and light absorbers may be added. Light absorbers are an important additive, both for imparting stability to the polyesters and to protect products packaged in PET containers from degradation induced by exposure to visible and UV light. U.S. Pat. No. 4,617,374 (hereinafter '374 patent) discloses the use of certain UV-absorbing methine compounds that may be incorporated in a polyester or a polycarbonate during polycondensation. These compounds enhance ultraviolet or visible light absorption with a maximum absorbance within the range of from about 320 nm to about 380 nm. Functionally, these compounds contain an acid or ester group which condenses onto the polymer chain as a terminator. Moreover, the UV absorbers of the '374 patent have been found to be useful in the preparation of polyesters such as poly(ethylene terephthalate) and copolymers of poly(ethylene terephthalate) and poly(1,4-cyclohexylenedimethylene terephthalate). It has been observed, however, that some light absorbing compounds are somewhat volatile causing the yield of these light absorbers in the formed polyester to be somewhat less than 100% (values of 80% to 85% are typical). Moreover, these compounds may plug the equipment by condensing in the process lines. The loss of light absorber results in added costs for the polyester formation because of the down time needed to clean process lines and because of the relatively high cost of these compounds.

Accordingly, there is a need for improved methods of incorporating light absorbing compounds into polyester compositions made by the melt phase polycondensation method, and/or improved polyester compositions containing light absorbers.

SUMMARY OF THE INVENTION

The present invention overcomes the problems of the prior art by providing a method of incorporating a light absorber into a polyester resin.

In one embodiment, a method comprises forming a reaction mixture substantially free of a titanium containing ester exchange catalyst compound and comprising combining a diol, a diacid component selected from the group consisting of dicarboxylic acids, dicarboxylic acid derivatives, and mixtures thereof, an antimony containing compound in an amount of less than 0.1% of the total weight of the reaction mixture, a phosphorus containing compound present in an amount of less than about 0.1% of the total weight of the reaction mixture, a metal containing compound selected from the group consisting of zinc containing compounds and/or manganese containing compounds, present in an amount from about 10 ppm to about 300 ppm, and a light absorber with polyester reactive moieties. The antimony containing compound, the phosphorus containing compound, and the metal-containing compound comprise the catalyst system used to promote the condensation polymerization that occurs in the method of the invention. The reaction mixture is then polymerized in a polycondensation reaction system in the absence of the titanium ester exchange catalyst compound. The polycondensation reaction system is characterized by having a first reaction chamber, a last reaction chamber, and optionally one or more intermediate reaction chambers between the first reaction chamber and the last reaction chamber. The reaction system is operated in series such that the reaction mixture is progressively polymerized in the first reaction chamber, the one or more intermediate reactions, and the last reaction chamber. Accordingly, as the reaction mixture proceeds through the series of reaction chambers, polymerization occurs and a polyester is formed by the condensation reaction of the diol and the diacid component. Moreover, volatile compounds are removed in each reaction chamber and the average molecular weight of the polyester increases from reactor to reactor by the decreasing reaction pressures of the successive reaction chambers.

In another embodiment of the present invention, a method of incorporating a light absorber in a polyester composition is provided. The method of this embodiment comprises.

a) forming a reaction mixture comprising combining:
 a diol,
 a diacid component selected from the group consisting of
  dicarboxylic acids, dicarboxylic acid derivatives, and
  mixtures thereof in a polycondensation reaction system
  comprising a series of reaction chambers designated as
  reaction chamber $RC^i$ having a first reaction chamber
  designated as reaction chamber $RC^1$, a last reaction
  chamber designated as reaction chamber $RC^k$, and one
  or more intermediate reaction chambers
b) successively polymerizing the reaction mixture in the multi-chamber polymerization system wherein the reaction system is operated in series such that a reaction product designated as product $P^i$ from reaction chamber $RC^i$ is transportable to reaction chamber $RC^{i+1}$ by a conduit designated as conduit $C^i$ connecting reaction chamber $RC^i$ to reaction chamber $RC^{i+1}$; and c) adding the light absorber to reaction product $P^i$ as it is transported from reaction chamber $RC^i$ to reaction chamber $RC^{i+1}$, wherein i and k are integers and k is the total number of reaction chambers.

In another embodiment of the present invention, a titanium metal free polyester composition is provided. The titanium free polyester composition of this embodiment comprises a diol residue, as diacid residue, a light absorber residue, antimony atoms, phosphorus atoms, and metal atoms selected from the group consisting of zinc, manganese, and mixtures thereof. The antimony, phosphorus, and metal atoms represent the residue of the catalyst system used to promote the condensation polymerization that forms the polyester composition.

In yet another embodiment of the present invention, an article made from the polyester is provided.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The term "residue" as used herein, refers to the portion of a compound that is incorporated into a polyester composition.

In an embodiment of the present invention, a method for incorporating a light absorber into a polyester resin is provided. The method of this embodiment comprises forming a reaction mixture substantially free of a titanium containing ester exchange catalyst compound and comprising a diol, a diacid component selected from the group consisting of dicarboxylic acids, dicarboxylic acid derivatives, and mixtures thereof, an antimony containing compound in an amount of less than 0.1% of the total weight of the reaction mixture, a phosphorus containing compound present in an amount of less than about 0.1% of the total weight of the reaction mixture, a metal containing compound selected from the group consisting of zinc containing compounds, manganese containing compounds, present in an amount from about 10 ppm to about 300 ppm, and a light absorber. We have found that polyester compositions can be made from reaction mixtures substantially free of titanium containing ester exchange catalysts. As used herein, the phrase "substantially free", or "in the absence of" does not preclude the presence of trace amounts of titanium containing compounds, and in this regard, the presence of 0 to about 5 ppm of titanium metal is considered a trace amount which can be found in the polyester composition made by what is considered to be a process conducted in the absence of a titanium containing ester exchange catalyst. Preferably, the process is conducted using compounds containing 2 ppm or less of titanium metal, and more preferably 0.0 ppm of titanium metal containing compounds are used in the process of the invention. Although it is desired to keep titanium metal to a minimum, of from 0 to about 5 ppm of titanium metal, desirably, less than 2 ppm can be added to the polyester composition and still be in accordance with the present invention. More desirably, 0.0 ppm of titanium metal is added to the polyester composition.

In this embodiment, the reaction mixture is then polymerized in a multi-chamber polymerization system. The polycondensation reaction system is characterized by having a first reaction chamber, a last reaction chamber, and one or more intermediate reaction chambers between the first reaction chamber and the last reaction chambers. The reaction system is operated in series such that the reaction mixture is progressively polymerized in the first reaction chamber, the one or more intermediate reactions, and the last reaction chamber. The light absorber may be added at any point in the melt phase. The polyester removed from the last reaction chamber has an inherent viscosity from about 0.2 to about 0.75 dL/g. Finally, the reaction mixture is further characterized by having from 0.0 to about 5 ppm titanium containing atoms.

Broadly, the light absorbers which are useful for the practice of the invention are disclosed in U.S. Pat. Nos. 4,981,516; 5,030,708; 5,401,438; 4,661,566; 4,617,373; 5,106,942; 5,274,072; 5,456,725; 6,207,740; and 6,559,216, the entire disclosures of which are incorporated herein by reference. More specifically, the UV-visible light absorbing compounds which are useful in the practice of this invention have at least one methine moiety defined herein as "the group

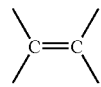

conjoined with a conjugated aromatic or heteroaromatic system". This moiety imparts the property of ultraviolet and/or visible light absorption, generally within the range of about 350–650 nanometers (nm). More preferably, the compounds absorb light within the range of about 350 to 550 nm. The methine compounds usually have molecular weight of from about 200 to about 600 Daltons, although lesser and higher molecular weights are useful. The light absorbing compounds are further characterized by having at least one polyester reactive group which will react with at least one of the functional groups from which the polyester is prepared into the polymer chain during polyester preparation. Such polyester reactive groups are selected from hydroxyl, carboxy, amino $C_1$–$C_6$-alkoxycarbonyl, $C_1$–$C_6$-alkoxycarbonyloxy, and $C_1$–$C_6$-alkanoyloxy. These light-absorbing compounds are thermally stable at polymer processing temperatures up to about 300° C.

Preferred methine light absorbing compounds or monomers useful in the practice of the present invention have the general formulae:

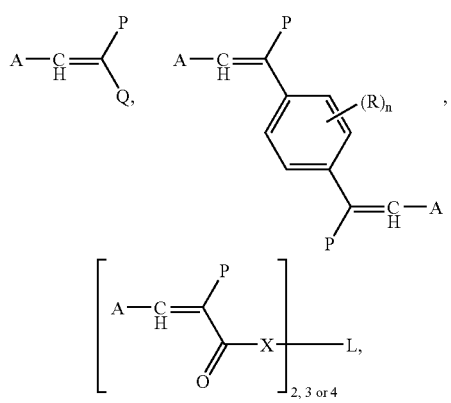

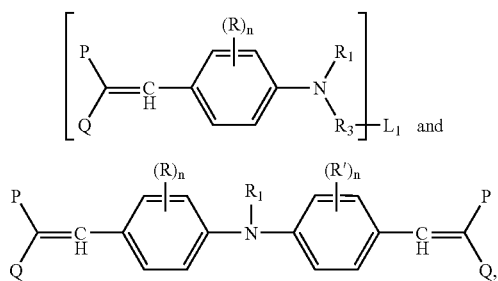

wherein:

A is conjugated with the attached double bond and is selected from the group of nitrogen containing moieties having the following formulae:

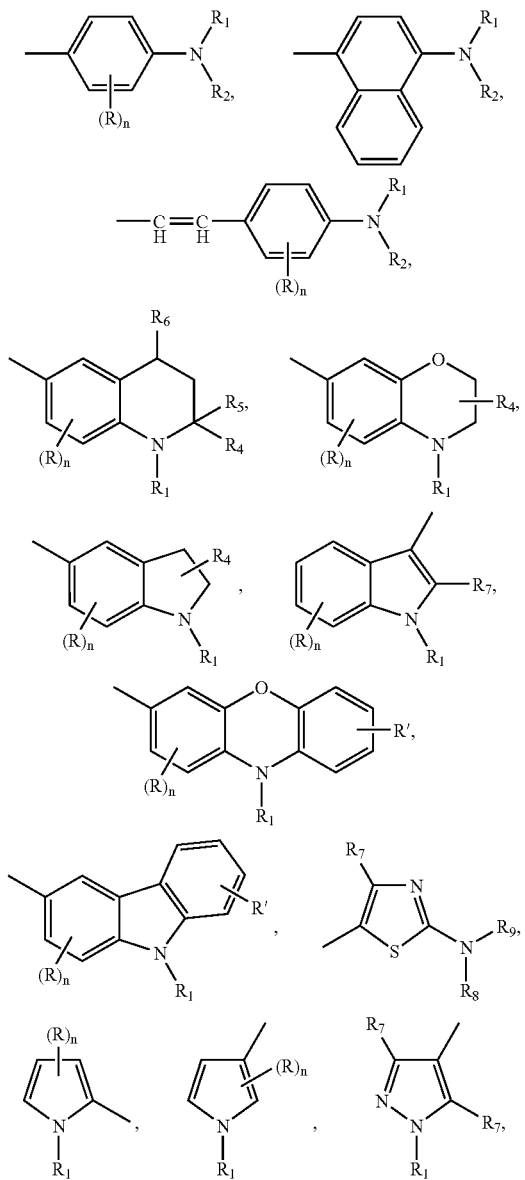

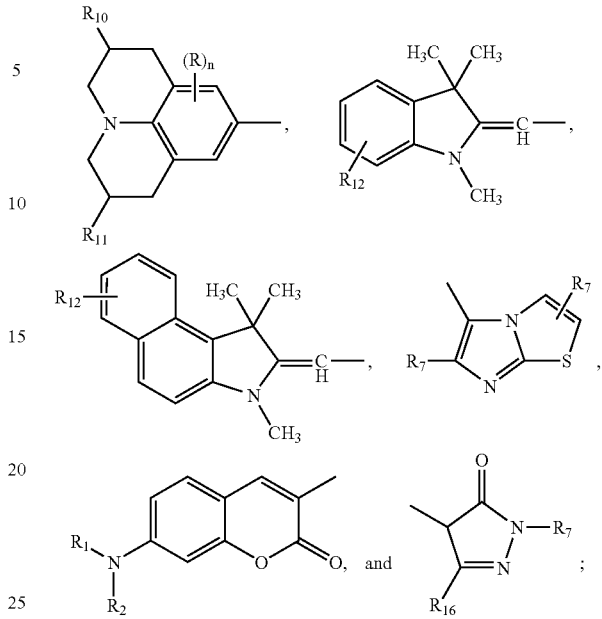

R and R' are independently selected from hydrogen, $C_1$–$C_6$-alkyl, $C_1$–$C_6$-alkoxy and halogen;

n is 1 or 2;

$R_1$ is selected from $C_3$–$C_8$-cycloalkyl, $C_3$–$C_8$-alkenyl, aryl, $C_1$–$C_{12}$-alkyl, substituted $C_1$–$C_{12}$-alkyl, and —(CHR$_{13}$CHR$_{14}$O)$_m$—R$_{15}$, wherein: m is an integer from 1 to about 500, preferably from 1 to about 100, more preferably from 1 to 8, and most preferably from 1 to 3; and $R_2$ is selected from $C_3$–$C_8$-cycloalkyl, $C_3$–$C_8$-alkenyl, aryl, $C_1$–$C_{12}$-alkyl, substituted $C_1$–$C_{12}$-alkyl, —(CHR$_{13}$CHR$_{14}$O)$_m$—R$_{15}$, and acyl group selected from —COR$_{16}$, —CO$_2$R$_{16}$, —CONHR$_{16}$— and —SO$_2$R$_{16}$, with the provision that when $R_2$ is an acyl group $R_1$ may be hydrogen; or $R_1$ and $R_2$ can be combined with the nitrogen atom to which they are attached to make cyclic structures selected from pyrrolidino, piperidino, piperazino, morpholino, thiomorpholino, thiomorpholino-S,S-dioxide, succinimido, and phthalimido;

$R_3$ is selected from $C_1$–$C_6$-alkylene, and —(CHR$_{13}$CHR$_{14}$O)$_m$—CHR$_{13}$CHR$_{14}$—;

$R_4$, $R_5$ and $R_6$ are independently selected from hydrogen and $C_1$–$C_6$-alkyl;

$R_7$ is selected from hydrogen, $C_1$–$C_6$-alkyl and aryl;

$R_8$ and $R_9$ are independently selected from $C_1$–$C_{12}$-alkyl, substituted $C_1$–$C_{12}$-alkyl, aryl, $C_3$–$C_8$-cycloalkyl, and $C_3$–$C_8$-alkenyl or $R_8$ and $R_9$ can be combined with the nitrogen atom to which they are attached to produce cyclic structures such as pyrrolidino, piperidino and morpholino;

$R_{10}$ and $R_{11}$, are independently selected from hydrogen, halogen, $C_1$–$C_6$-akyl, hydroxyl and $C_1$–$C_6$-alkanoyloxy;

$R_{12}$ is carboxy, $C_1$–$C_6$-alkoxycarbonyl or (R)$_n$;

$R_{13}$ and $R_{14}$ are independently selected from hydrogen and $C_1$–$C_6$-alkyl;

$R_{15}$ is selected from hydrogen, aryl, $C_1$–$C_{12}$-alkyl, and $C_1$–$C_6$-alkanoyloxy;

$R_{16}$ is selected from $C_1$–$C_6$-alkyl, $C_3$–$C_8$-alkenyl, aryl, and $C_3$–$C_8$-cycloalkyl;

X is selected from —O—, —NH and —N(R$_{16}$)—;

L is a di, tri or tetravalent linking group;

$L_1$ is selected from a direct single bond or a divalent linking group;

P and Q are independently selected from cyano, —$COR_{16}$, —$COR_{16}$, —$CO_2R_{16}$, —$CON(R_{17})R_{18}$, aryl, heteroaryl, and —$SO_2R_{16}$; or P and Q can be combined with the conjugated double-bonded carbon atom to which they are attached to produce the following cyclic divalent radicals:

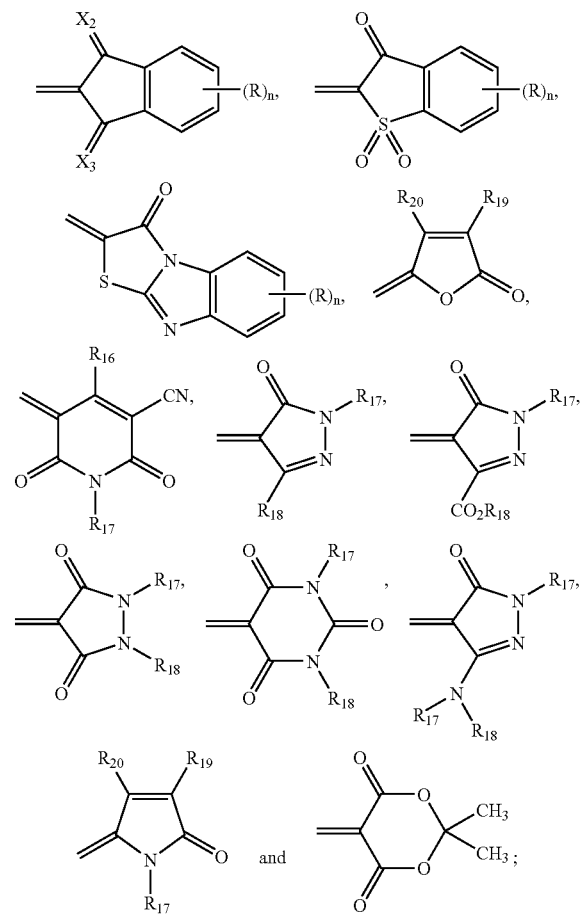

$R_{17}$ and $R_{18}$ are independently selected from hydrogen, $C_1$–$C_6$-alkyl, aryl $C_3$–$C_8$-cycloalkyl, and $C_3$–$C_8$-alkenyl;

$R_{19}$ is selected from cyano, carboxy, —$CO_2R_{16}$, —$CON(R_{17})R_{18}$ and

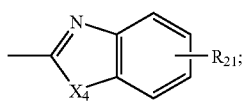

$R_{20}$ is selected from aryl and heteroaryl;

$X_2$ and $X_3$ are independently selected from oxygen and =C(CN)CN;

$X_4$ is selected from —O—, —S—, —$N(R_{17})$—;

$R_{21}$, is selected from hydrogen, or up to two groups selected from $C_1$–$C_6$-alkyl, $C_1$–$C_6$-alkoxy, halogen, carboxy, cyano and —$CO_2R_{16}$; with the provision that Q may be hydrogen when P is selected from -carboxy, —$CO_2R_{16}$, —$C(R_{20})$=C(CN)CN and

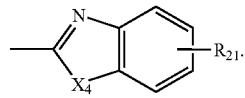

Some of the methine compounds described herein without polyester reactive groups may give increased color yields when utilized under the conditions described in this invention. However, it is preferred that the methine compounds useful in the present invention have at least one reactive group selected from carboxy, —$CO_2R_{16}$, —$OCOR_{16}$, —$OCON(R_{17})R_{18}$, —$OCO_2R_{16}$, hydroxyl and chlorocarbonyl, that is capable of reacting into the polyester composition during preparation.

The term "$C_1$–$C_{12}$-alkyl" is used herein to denote an aliphatic hydrocarbon radical that contains one to twelve carbon atoms and is either a straight or branched chain.

The term "substituted $C_1$–$C_{12}$-alkyl" is used herein to denote a $C_1$–$C_{12}$-alkyl radical substituted with 1–3 groups selected from halogen, hydroxyl, cyano, carboxy, succinimide, phthalimido, 2-pyrrolidino, $C_3$–$C_8$-cycloalkyl, aryl, heteroaryl, vinylsulfonyl, phthalimidino, o-benzoic sulfimido, —$OR_{22}$, —$SR_{23}$, —$SO_2R_{24}$, —$SO_2CH_2CO_2SR_{23}$, —$CON(R_{25})R_{26}$, —$SO_2N(R_{25})R_{26}$, —$O_2CN(R_{25})R_{26}$, —$OCOR_{24}$, —$O_2CR_{24}$, —$OCO_2R_{24}$, —$OCR_{24}$, —$N(R_{25})SO_2R_{24}$, —$N(R_{25})COR_{24}$,

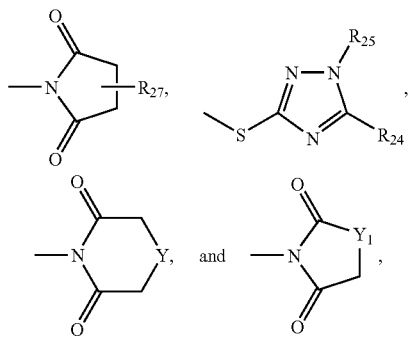

wherein:

$R_{22}$ is selected from $C_1$–$C_6$-alkyl, $C_3$–$C_8$-cycloalkyl; $C_3$–$C_8$-alkenyl and aryl;

$R_{23}$ is selected from $C_1$–$C_6$-alkyl, $C_3$–$C_8$-cycloalkyl, aryl and heteroaryl;

$R_{24}$ is selected from $C_1$–$C_6$-alkyl, $C_3$–$C_8$-cycloalkyl and aryl;

$R_{25}$ and $R_{26}$ are independently selected from hydrogen, $C_1$–$C_6$-alkyl, $C_3$–$C_8$-cycloalkyl and aryl;

$R_{27}$ is selected from hydroxy and $C_1$–$C_6$-alkanoyloxy;

Y is selected from —O—, —S—, and —$N(R_{24})$—;

$Y_1$ is selected from $C_2$–$C_4$-alkylene, —O—, —S—, and —$N(R_{25})$—.

The term "$C_1$–$C_6$-alkyl" is used to denote straight and branched chain hydrocarbon radicals, which may optionally be substituted with up to two groups selected from hydroxyl, halogen, carboxy, cyano, aryl, arylthio, arylsulfonyl, $C_1$–$C_6$-alkoxy, $C_1$–$C_6$-alkylthio, $C_1$–$C_6$-alkylsulfonyl, $C_1$–$C_6$-alkoxycarbonyl, $C_1$–$C_6$-alkoxycarbonyloxy, and $C_1$–$C_6$-alkanoyloxy.

The terms "$C_1$–$C_6$-alkoxy", "$C_1$–$C_6$-alkylthio", "$C_1$–$C_6$-alkylsulfonyl", "$C_1$–$C_6$-alkoxycarbonyl", "$C_1$–$C_6$-alkoxycarbonyloxy" and "$C_1$–$C_6$-alkanoyloxy" denote the following structures, respectively: —O$C_1$–$C_6$-akyl, —S—$C_1$–$C_6$-alkyl, —$O_2$S—$C_1$–$C_6$-alkyl, —$CO_2$—$C_1$–$C_6$-alkyl, —$O_2$C—O—$C_1$–$C_6$-alkyl, and —$O_2$C—$C_1$–$C_6$-alkyl, wherein the $C_1$–$C_6$alkyl groups may optionally be substituted with up to two groups selected from hydroxy, cyano, halogen, aryl, —O$C_1$–$C_4$-alkyl, —OCO$C_1$–$C_4$-alkyl and $CO_2C_1$–$C_4$-alkyl, wherein the $C_1$–$C_4$-alkyl portion of the group represents saturated straight or branched chain hydrocarbon radicals that contain one to four carbon atoms.

The terms "$C_3$–$C_8$-cycloalkyl" and "$C_3$–$C_8$-alkenyl" are used to denote saturated cycloaliphatic radicals and straight or branched chain hydrocarbon radicals containing at least one carbon-carbon double bond, respectively, with each radical containing 3–8 carbon atoms.

The divalent linking groups for L can be selected from $C_1$–$C_{12}$-alkylene, —(CH$R_{13}$CH$R_{14}$O)$_m$CH$R_{13}$CH$R_{14}$—, $C_3$–$C_8$-cycloalkylene —CH$_2$—$C_3$–$C_8$-cycloalkylene —CH$_2$— and $C_3$–$C_8$-alkenylene. The $C_1$–$C_{12}$ alkylene linking groups may contain within their main chain heteroatoms, e.g. oxygen, sulfur and nitrogen and substituted nitrogen, (—N($R_{17}$)—), wherein $R_{17}$ is as previously defined, and/or cyclic groups such as $C_3$–$C_8$-cycloalkylene, arylene, divalent heteroaromatic groups or ester groups such as:

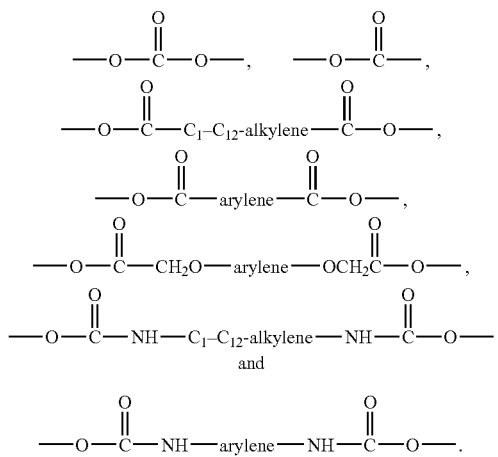

Some of the cyclic moieties which may be incorporated into the $C_1$–$C_{12}$-alkylene chain of atoms include:

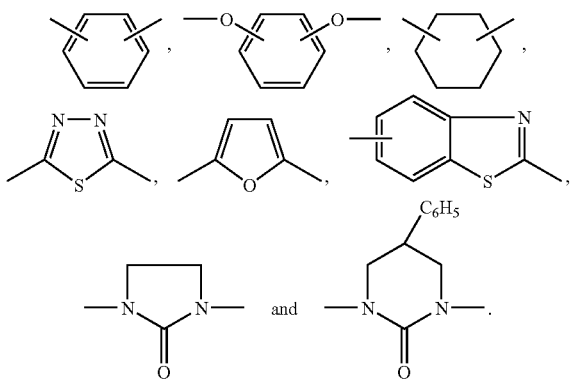

The trivalent and tetravalent radicals for L are selected from $C_3$–$C_8$-aliphatic hydrocarbon moieties which contain three or four covalent bonds. Examples of trivalent and tetravalent radicals include —HC(CH$_2$—)$_2$ and C(CH$_2$—)$_4$, respectively.

The divalent linking groups for $L_1$ may be selected from —O—, —S—, —SO$_2$—, =N—SO$_2$R$_1$, —S—S—, —CO$_2$—, —OCO$_2$—, arylene, —O-arylene-O—, $C_3$–$C_8$-cycloalkylene, —O$_2$C—$C_1$–$C_{12}$-alkylene-CO$_2$—, —O$_2$C-arylene-CO$_2$—, —O$_2$C—$C_3C_8$-cycloalkylene-CO$_2$—, —O$_2$CNH—$C_1$–$C_{12}$-alkylene-NHCO$_2$—, and —O$_2$CNH-arylene-NHCO$_2$—.

The terms "$C_2$–$C_4$-alkylene", "$C_1$–$C_6$-alkylene" and "$C_1$–$C_{12}$-alkylene" denote straight or branded chain divalent hydrocarbon radicals containing two to four, one to six and one to twelve carbon atoms, respectively, which may optionally may be substituted with up to two groups selected from hydroxyl, halogen, aryl and $C_1$–$C_6$-alkanoyloxy.

The terms "$C_3$–$C_8$-cycloalkylene" and "$C_3$–$C_8$-alkylene" denote divalent saturated cyclic hydrocarbon radicals which contain three to eight carbon atoms and divalent hydrocarbon radicals which contain at least one carbon-carbon double bond and have three to eight carbon atoms, respectively.

The term "aryl" is used herein to denote phenyl and phenyl substituted with one or more groups selected from $C_1$–$C_6$-alkyl, $C_1$–$C_6$-alkoxy, halogen, carboxy, hydroxyl, $C_1$–$C_6$-alkoxycarbonyl, $C_1$–$C_6$-alkylsulfonyl, $C_1$–$C_6$-alkythio, thiocyano, cyano, nitro and trifluoromethyl.

In the term "heteroaryl" the heteroaryl groups or heteroaryl portions of the groups are mono or bicyclo heteroaromatic radicals containing at least one heteroatom selected from the group consisting of oxygen, sulfur and nitrogen or a combination of these atoms in combination with carbon to complete through the heteroatomatic ring. Examples of suitable heteroaryl groups include but are not limited to: furyl, thienyl, thiazolyl, isothiazolyl, benzothiazolyl, pyrazolyl, pyrrolyl, thiadiazolyl, oxadiazolyl, benzoxazolyl, benzimidazolyl, pyridyl, pyrimidinyl and triazolyl and such groups optionally substituted with one or more groups selected from $C_1$–$C_6$-alkyl, $C_1$–$C_6$-alkoxy, aryl, $C_1$–$C_6$-alkoxy, carbonyl, halogen, arylthio, arylsulfonyl, $C_1$–$C_6$-alkylthio, $C_1$–$C_6$-alkylsulfonyl, cyano, trifluoromethyl, and nitro.

The term "arylene" is used to denote 1,2-; 1,3-; 1,4-phenylene, naphthyl and those radicals optionally substituted with one or more groups selected from $C_1$–$C_6$-alkyl, $C_1$–$C_6$-alkoxy, halogen, carboxy, hydroxyl, $C_1$–$C_6$-alkoxycarbonyl, $C_1$–$C_6$-alkylsulfonyl, $C_1$–$C_6$-alkythio, thiocyano, cyano, nitro and trifluoromethyl.

The term halogen is used to denote fluorine, chlorine, bromine and iodine.

The alkoxylated moieties defined by the formulae: —(CH$R_{13}$CH$R_{14}$O)$_m$—$R_{15}$, and —(CH$R_{13}$CH$R_{14}$O)$_m$—CH$R_{13}$CH$R_{14}$—, have a chain length wherein m is from 1 to 500; preferably m is from 1 to about 100; more preferably m is less than 8, and most preferably m is from 1–3. In a preferred embodiment, the alkoxylated moieties are ethylene oxide residues, propylene oxide residues or residues of both.

The terms "pyrrolidino", "piperidino", "piperazino", "morpholino", "thiomorpholino" and "thiomorpholino-s,s-dioxide" are used herein to denote the following cyclic radicals, respectively:

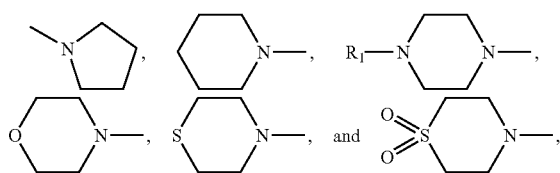

wherein $R_1$ is as defined above.

The skilled artisan will understand that each of the references herein to groups or moieties having a stated range of carbon atoms such as $C_1$–$C_4$-alkyl, $C_1$–$C_6$-alkyl, $C_1$–$C_{12}$-alkyl, $C_3$–$C_8$-cycloalkyl, $C_3$–$C_8$-alkenyl, $C_1$–$C_{12}$-alkylene, $C_1$–$C_6$-alkylene, includes moieties of all of the number of carbon atoms mentioned within the ranges. For example, the term "$C_1$–$C_6$-alkyl" includes not only the $C_1$ group (methyl) and $C_6$ group (hexyl) end points, but also each of the corresponding $C_2$, $C_3$, $C_4$, and $C_5$ groups including their isomers. In addition, it will be understood that each of the individual points within a stated range of carbon atoms may be further combined to describe subranges that are inherently within the stated overall range. For example, the term "$C_3$–$C_8$-cycloalkyl" includes not only the individual cyclic moieties $C_3$ through $C_8$, but also contemplates subranges such as $C_4$–$C_6$-cycloalkyl.

The level of light absorber added as a component of any of these embodiments is dependent on the application for which the polyester product is intended, the level of light exposure expected, the sensitivity of any article enclosed by the polyester to light, the molar extinction coefficient of the specific light absorber chosen, the thickness of the article to be prepared from the polyester, the nature of the other additives present in the polyester; including any colorants, opacifiers, catalyst residues, reheat agents, nucleators, de-nesting agents, slip agents etc. whether added prior to the polymerization, during the polymerization or post-polymerization, and the composition of the polyester repeat unit among other factors. Generally, for most packaging applications, the expected level of light absorber required would be between 0 and 5 wt. % based on the weight of polymer; more preferably between 0.001 and 2 wt. % based on the weight of polymer. These ranges stated are given for illustrative purposes only and are not intended to limit the scope of the present invention.

The polymerization is carried out such that the reaction pressure in the first chamber is from about 20 to 50 psi and the reaction pressure in the last reaction chamber is from about 0.1 mm Hg to about 2 mm Hg. The pressure in the intermediate reactor is successively dropped with the reaction pressure in each of the one or more intermediate reactor being between 50 psi and 0.1 mm Hg. The reaction temperature in each reaction chamber is from about 200° C. to about 300° C.

The reaction mixture used in the method of the invention includes a diol component. Preferably, the diol component is a glycol. Suitable diols include, for example, diols selected from the group consisting of ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl-1,3-cyclobutane diol; X,8-bis(hydroxymethyl)tricyclo-[5.2.1.0]-decane wherein X represents 3, 4, or 5, and diols containing one or more oxygen atoms in the chain, e.g., diethylene glycol, triethylene glycol, dipropylene glycol, tripropylene glycol and the like containing from about 2 to about 18, preferably 2 to 12 carbon atoms in each aliphatic moiety. Cycloaliphatic diols can be employed in their cis or trans configuration or as mixtures of both forms. More preferably, the diol comprises a component selected from the group consisting of ethylene glycol, diethylene glycol, 1,4-cyclohexanedimethanol, or mixtures thereof. In many cases, the diol may comprise a major amount of ethylene glycol and modifying amounts cyclohexanedimethanol and/or diethylene glycol.

The reaction mixture also includes a diacid component selected from the group consisting of aliphatic, alicyclic, or aromatic dicarboxylic acids and esters of such dicarboxylic acids. Suitable diacid components are selected from the group consisting of terephthalic acid, naphthalene dicarboxylic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, and the like; and esters of these dicarboxylic acids. In the polymer preparation, it is often preferable to use a functional acid derivative thereof such as the dimethyl, diethyl, or dipropyl ester of the dicarboxylic acid. The anhydrides of these acids also can be employed. Preferably, the diacid component comprises a dicarboxylic acid ester. More preferably, the diacid component is terephthalic acid or dimethyl terephthalate. Most preferably, the diacid component comprises dimethyl terephthalate. The molar ratio of the diol component to the diacid component is from about 0.5 to about 4. More preferably, the molar ratio of the diol component to the diacid component is from about 1 to about 3. Most preferably, the ratio of the diol to the diacid component is about 2.

The reaction mixture further comprises a component containing a metal selected from the group consisting of zinc, manganese, and mixtures thereof, antimony containing component, and a phosphorus containing component. Typically, the metal containing component is zinc acetate or manganese acetate, the antimony containing component is antimony trioxide, and the phosphorus containing component is phosphoric acid or an alkyl ester thereof. Preferably, the metal containing component is zinc acetate and is present in an amount from about 10 to about 200 ppm, the antimony trioxide is present in an amount from about 20 to about 500 ppm, and phosphorous is present in an amount from about 5 to about 200 ppm.

The reaction mixture optionally includes one or more components selected from the group consisting of an iron containing compound, a toner, a cobalt containing compound, and mixtures thereof. For example, the reaction mixture and the polyester compositions of the invention may contain black iron oxide in an amount ranging from 1 ppm to 50 ppm, or 1 ppm to 10 ppm.

In another embodiment of the present invention, a method of incorporating a light absorber in a polyester composition with or without a titanium containing ester exchange catalyst is provided. The method of this embodiment comprises forming a reaction mixture comprising a diol, a diacid component selected from the group consisting of dicarboxylic acids, dicarboxylic acid derivatives, and mixtures thereof in a polycondensation reaction system. The polycondensation reaction system comprises a series of reaction chambers. For purposes of differentiating each of the reaction chambers, each chamber may be assigned a label $RC^i$. Accordingly, each chamber is designatable as reaction chamber $RC^i$. The polycondensation system has a first reaction chamber designatable as reaction chamber $RC^1$, a last reaction chamber designatable as reaction chamber $RC^k$, and one or more intermediate reaction chambers. As used herein, i and k are integers, and k is the total number of reaction chambers. The polycondensation system is operated in series such that a reaction product designatable as product $P^i$ from reaction chamber $RC^i$ is directly or indirectly transportable to reaction chamber $RC^{i+1}$ by a conduit designatable as conduit $C^i$ connecting reaction chamber $RC^i$ to reaction chamber $RC^{i+1}$ (i.e., the polymerization product from each reaction chamber is transported to the next reaction chamber in the series). As used herein, "indirectly transportable" recognizes that the product from reaction chamber $RC^i$ can be physically disconnected from reaction chamber $RC^{i+1}$ but still provide feed stock to the reaction chamber, such as via tanker truck or rail car. However, for sake of brevity, it is assumed herein that such reaction chambers and conduits are in fluid communication, but the scope of the invention includes both direct and indirect product transfer. Accordingly, the reaction mixture is successively polymerized as it proceeds through the polycondensation system. Preferably, the light absorber is added to reaction product $p^{k-2}$ while reaction product $p^{k-2}$ is transported between reaction chamber $RC^{k-2}$ and reaction chamber $RC^{k-1}$ (i.e., the light absorber is added in the conduit connecting third from the last to the second from the last reaction chamber.) The light absorbers, the diol, and the diacid component are the same as set forth above with the same amounts as set forth above. The light absorber may be added neat or in a carrier such as the same or different diol used in $RC^1$. By feeding the light absorber into the conduit, it is possible to increase the yield of the light absorber in the polyester composition. Without being bound to a theory, it is believed that by feeding the light absorber into the conduit, the light absorber has a sufficient residence time to dissolve into the melt, or be absorbed onto the polymer, or otherwise remain in the melt in contrast with adding the light absorber to reaction chamber which typically operates under conditions promoting loss of the light absorber as it is carried off with the flashing of the diol. In this embodiment, the reaction is preferably conducted in the presence of 0.0 to 5 ppm titanium containing ester exchange catalysts, more preferably using 0.0 ppm titanium containing compounds.

In yet another embodiment of the present invention, a titanium free polyester composition is provided. Preferably, the polyester composition is made by any one of the methods of the, invention. The titanium free polyester composition of this embodiment comprises a diol residue, as diacid residue, a light absorber residue, antimony atoms present in an amount of less than 0.1%; phosphorus atoms present in an amount of less than about 0.1%; metal atoms selected from the group consisting of zinc, manganese, and mixtures thereof in an amount from about 5 ppm to about 300 ppm; and titanium atoms present in an amount ranging from 0.0 to 5 ppm. By a titanium free polyester composition is meant one which contains from 0.0 to 5 ppm titanium metal. The light absorber residue is of the light absorbing compound(s) discussed above. More preferably, the antimony atoms are present in an amount from about 20 to about 500 ppm and the phosphorus atoms are present in an amount from about 10 to about 200 ppm and the composition contains 2 ppm, most preferably 0.0 ppm titanium metal.

The diacid residue is preferably selected from the group consisting of dicarboxylic acid residues dicarboxylic acid derivative residues, and mixtures thereof. More preferably, the diacid residue is a dicarboxylic acid ester residue. Most preferably, the diacid residue is a dimethyl terephthalate residue. The diol residue is preferably a glycol residue. The diol residue is selected from the group consisting of ethylene glycol residue, diethylene glycol residue, 1,4-cyclohexanedimethanol residue, and mixtures thereof. The ratio of the diol residues to the diacid residues is from about 0.5 to about 4. Moreover, the polyester composition of the present invention has less than about 20 meq/g of carboxyl ends.

One skilled in the art will understand that various thermoplastic articles can be made from the polyester of the present invention where excellent light protection of the contents would be important. Examples of such articles includes bottles, storage containers, sheets, films, fibers, plaques, hoses, tubes, syringes, and the like. Basically, the possible uses for polyester having a low-color, low-migratory light absorber is voluminous and cannot easily be enveloped.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:
1. A method of incorporating a light absorber into a polyester resin, the method comprising:
   a) forming a reaction mixture substantially free of a titanium containing ester exchange catalyst compound and comprising combining:
      a diol,
      a diacid component comprising dicarboxylic acids,
      an antimony containing compound in an amount of less than 0.1% of the total weight of the reaction mixture,
      a phosphorus containing compound present in an amount of less than about 0.1% of the total weight of the reaction mixture,
      a metal containing compound selected from the group consisting of zinc containing compounds, manganese containing compounds, present in an amount from about 10 ppm to about 300 ppm, and
      a light absorbing compound, wherein said light absorbing compound is selected from the group consisting of compounds having have the formulae:

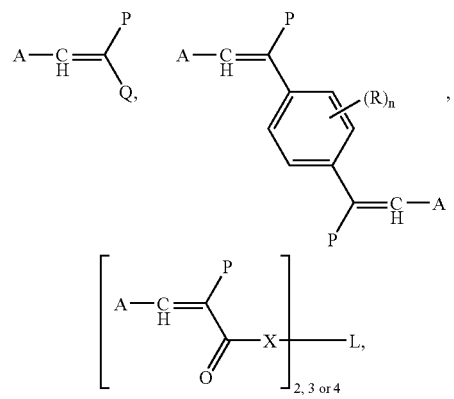

-continued

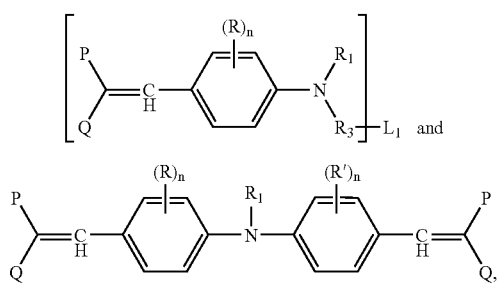

wherein:

A is conjugated with the attached double bond and is selected from the group consisting of nitrogen containing moieties having the following formulae:

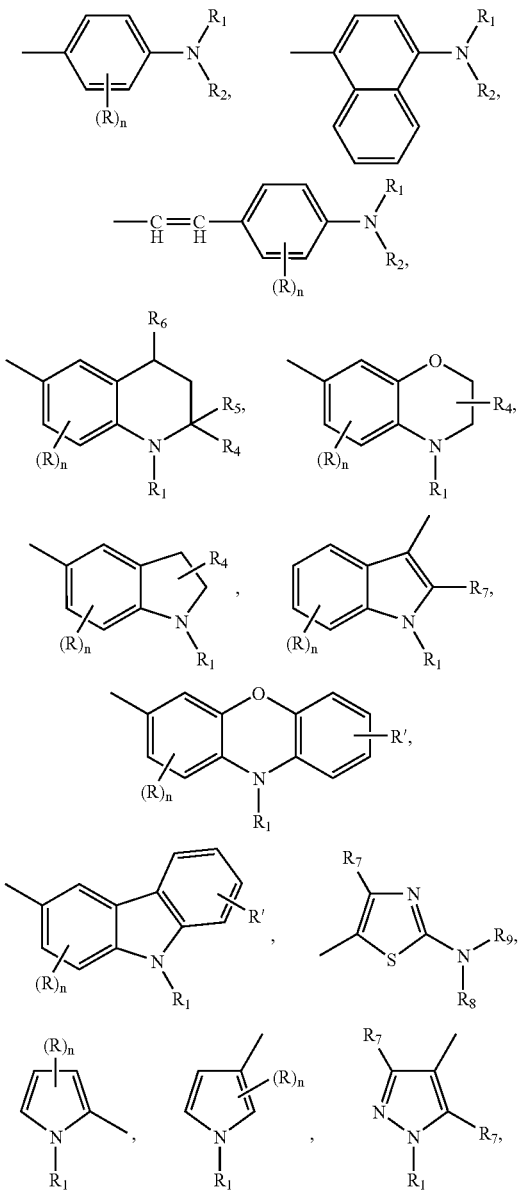

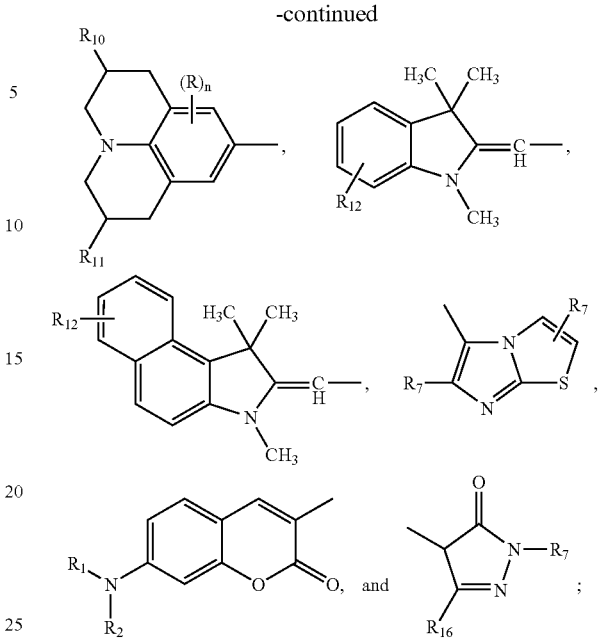

R and R' are independently selected from the group consisting of hydrogen, $C_1$–$C_6$-alkyl, $C_1$–$C_6$-alkoxy and halogen;

n is 1 or 2;

$R_1$ is selected from the group consisting of $C_3$–$C_8$-cycloalkyl, $C_3$–$C_8$-alkenyl, aryl, $C_1$–$C_{12}$-alkyl, substituted $C_1$–$C_{12}$-alkyl, and —(CHR$_{13}$CHR$_{14}$O)$_m$—R$_{15}$, wherein m is an integer from 1 to about 500; and $R_2$ is selected from the group consisting of $C_3$–$C_8$-cycloalkyl, $C_3$–$C_8$-alkenyl, aryl, $C_1$–$C_{12}$-alkyl, substituted $C_1$–$C_{12}$-alkyl, —(CHR$_{13}$CHR$_{14}$O)$_m$—R$_{15}$, wherein m is an integer from 1 to about 500, and an acyl group selected from —COR$_{16}$, —CO$_2$R$_{16}$, —CONHR$_{16}$— and —SO$_2$R$_{16}$, with the provision that when $R_2$ is an acyl group $R_1$ may be hydrogen; or $R_1$ and $R_2$ can be combined with the nitrogen atom to which they are attached to make cyclic structures selected from the group consisting of pyrrolidino, piperidino, piperazino, morpholino, thiomorpholino, thiomorpholino-S,S-dioxide, succinimido, and phthalimido;

$R_3$ is selected from the group consisting of $C_1$–$C_6$-alkylene, and —(CHR$_{13}$CHR$_{14}$O)$_m$—CHR$_{13}$CHR$_{14}$—, wherein m is an integer from 1 to about 500;

$R_4$, $R_5$ and $R_6$ are independently selected from the group consisting of hydrogen and $C_1$–$C_6$-alkyl;

$R_7$ is selected from the group consisting of hydrogen, $C_1$–$C_6$-alkyl and aryl;

$R_8$ and $R_9$ are independently selected from the group consisting of $C_1$–$C_{12}$-alkyl, substituted $C_1$–$C_{12}$-alkyl, aryl, $C_3$–$C_8$-cycloalkyl, and $C_3$–$C_8$-alkenyl; or $R_8$ and $R_9$ can be combined with the nitrogen atom to which they are attached to produce cyclic structures selected from the group consisting of pyrrolidino, piperidino and morpholino;

$R_{10}$ and $R_{11}$ are independently selected from the group consisting of hydrogen, halogen, $C_1$–$C_6$-alkyl, hydroxyl and $C_1$–$C_6$-alkanoyloxy;

$R_{12}$ is selected from the group consisting of carboxy, $C_1$–$C_6$-alkoxycarbonyl and (R)$_n$;

$R_{13}$ and $R_{14}$ are independently selected from the group consisting of hydrogen and $C_1$–$C_6$-alkyl;

$R_{15}$ is selected from the group consisting of hydrogen, aryl, $C_1$–$C_{12}$-alkyl, and $C_1$–$C_6$-alkanoyloxy;

$R_{16}$ is selected from the group consisting of $C_1$–$C_6$-alkyl, $C_3$–$C_8$-alkenyl, aryl, and $C_3$–$C_8$-cycloalkyl;

X is selected from the group consisting of —O—, —NH and —N($R_{16}$)—;

L is a di, tri or tetravalent linking group;

$L_1$ is selected from the group consisting of a direct single bond or a divalent linking group;

P and Q are independently selected from the group consisting of cyano, —COR$_{16}$, —CO$_2$R$_{16}$, —CON(R$_{17}$)R$_{18}$, aryl, heteroaryl, and —SO$_2$R$_{16}$; or P and Q can be combined with the conjugated double-bonded carbon atom to which they are attached to produce divalent radicals selected from the group consisting of the following formulae:

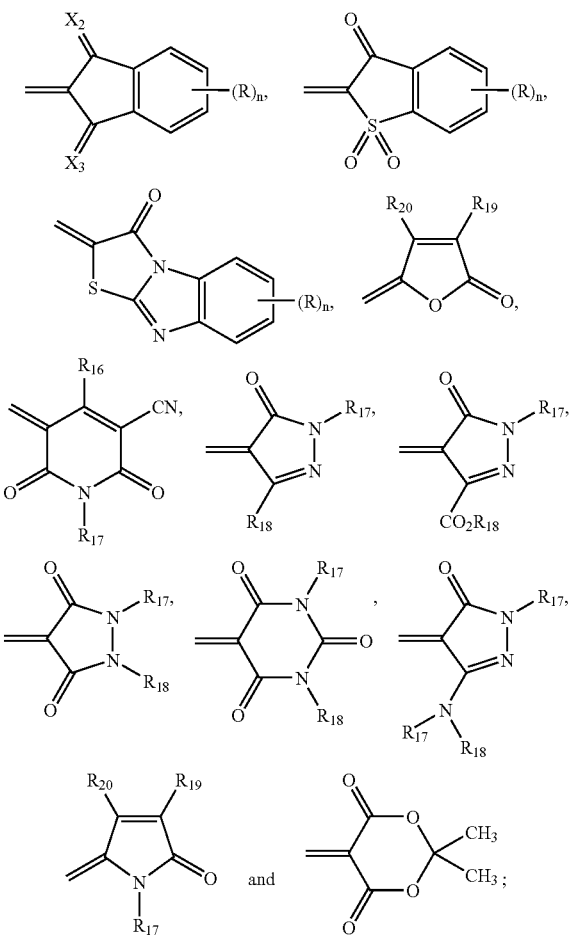

wherein:
$R_{17}$ and $R_{18}$ are independently selected from the group consisting of hydrogen, $C_1$–$C_6$-alkyl, aryl $C_3$–$C_8$-cycloalkyl, and $C_3$–$C_8$-alkenyl;

$R_{19}$ is selected from the group consisting of cyano, carboxy, —CO$_2$R$_{16}$, —CON(R$_{17}$)R$_{18}$ and

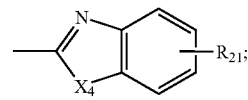

$R_{20}$ is selected from the group consisting of aryl and heteroaryl;

$X_2$ and $X_3$ are independently selected from the group consisting of oxygen and =C(CN)CN;

$X_4$ is selected from the group consisting of —O—, —S—, —N(R$_{17}$)—;

$R_{21}$ is selected from the group consisting of hydrogen and up to two groups selected from $C_1$–$C_6$-alkyl, $C_1$–$C_6$-alkoxy, halogen, carboxy, cyano and —CO$_2$R$_{16}$, with the provision that Q may be hydrogen when P is selected from the group consisting of -carboxy, —CO$_2$R$_{16}$, —C(R$_{20}$)=C(CN)CN and

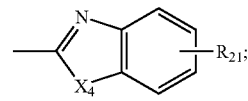

and wherein the light absorbing compound includes a polyester reactive group; and b) polymerizing the reaction mixture in a polycondensation reaction system, the polycondensation reaction system having a first reaction chamber, a last reaction chamber, and one or more intermediate reaction chambers between the first reaction chamber and the last reaction chamber, wherein the reaction system is operated in series to progressively polymerize the reaction mixture in the first reaction chamber, the one or more intermediate reactions, and the last reaction chamber.

2. The method of claim 1 wherein $R_1$ and $R_2$ combine to make cyclic structures selected from the group consisting of pyrrolidino, piperidino, piperazino, morpholino, thiomorpholino, thiomorpholino-S,S-dioxide, succinimido, and phthalimido.

3. The method of claim 1 wherein $R_8$ and $R_9$ combine to produce a cyclic structure selected from the group consisting of pyrrolidino, piperidino and morphalino.

4. The method of claim 1 wherein P and Q are combined with the conjugated double-bonded carbon atom to which they are attached to produce the cyclic divalent radicals selected from the group consisting of the following formulae:

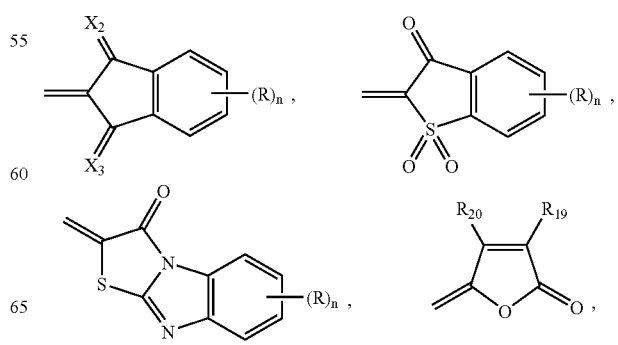

-continued

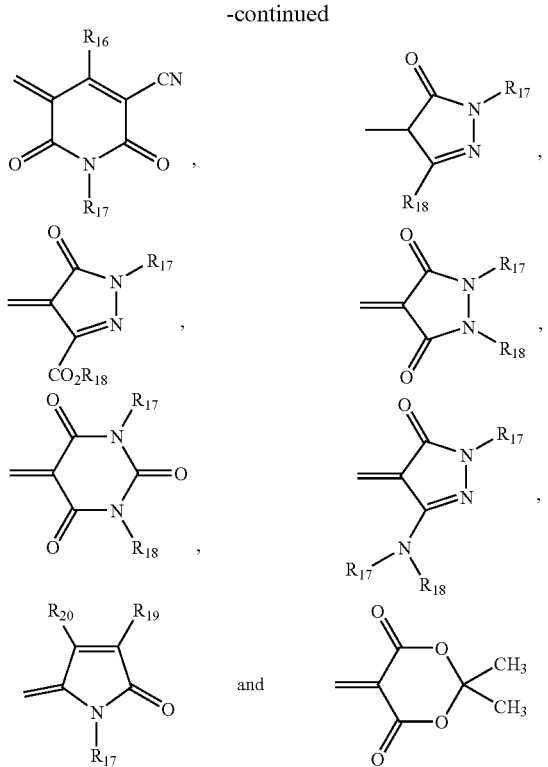

wherein:

$R_{17}$ and $R_{18}$ are independently selected from the group consisting of hydrogen, $C_1$–$C_6$-alkyl, aryl $C_3$–$C_8$-cycloalkyl, and $C_3$–$C_8$-alkenyl;

$R_{19}$ is selected from the group consisting of cyano, carboxy, —$CO_2R_{16}$, —$CON(R_{17})R_{18}$ and

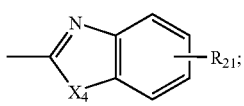

$R_{20}$ is selected from the group consisting of aryl and heteroaryl;

$X_2$ and $X_3$ are independently selected from the group consisting of oxygen and =C(CN)CN;

$X_4$ is selected from the group consisting of —O—, —S—, —N($R_{17}$)—;

$R_{21}$ is selected from the group consisting of hydrogen and up to two groups selected from $C_1$–$C_6$-alkyl, $C_1$–$C_6$-alkoxy, halogen, carboxy, cyano and —$CO_2R_{16}$, with the provision that Q may be hydrogen when P is selected from the group consisting of -carboxy, —$CO_2R_{16}$, —$C(R_{20})$=C(CN)CN and

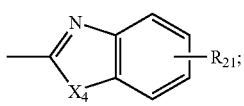

and wherein the light absorbing compound includes a polyester reactive group.

5. The method of claim 1 wherein from 0.0 to 2 ppm titanium containing ester exchange catalyst compound, based on the amount of titanium metal is added to the reaction mixture.

6. The method of claim 1 wherein the reaction pressure in the first chamber is from about 20 to 50 psi and the reaction pressure in the last reaction chamber is from about 0.1 mm Hg to about 2 mm Hg, and the reaction pressure in each of the one or more intermediate reactor being between 50 psi and 0.1 mm Hg.

7. The method of claim 1 wherein no titanium containing ester exchange catalyst compound is added to the reaction mixture.

8. The method of claim 1 wherein the diol component is selected from the group consisting of ethylene glycol; 1,4-cyclohexanedimethanol; 1,2-propanediol; 1,3-propanediol; 1,4-butanediol; 2,2-dimethyl-1,3-propanediol; 1,6-hexanediol; 1,2-cyclohexanediol; 1,4-cyclohexanediol; 1,2-cyclohexanedimethanol; 1,3-cyclohexanedimethanol; 2,2,4,4-tetramethyl-1,3-cyclobutane diol; X,8-bis(hydroxymethyl) tricyclo-[5.2.1.0]-decane, wherein X represents 3, 4, or 5; diols containing one or more oxygen atoms in a chain and mixtures thereof.

9. The method of claim 1 wherein the diacid component comprises a component selected from the groups consisting of terephthalic acid, isophthalic acid, naphthalene dicarboxylic acid, 1,4-cyclohexanedicarboxylic acid, 1,3-cyclohexanedicarboxylic acid, succinic acid, glutaric acid, adipic acid, sebacic acid, 1,12-dodecanedioic acid, and mixtures thereof.

10. The method of claim 1 wherein the diacid component comprises terephthalalic acid.

11. The method of claim 1 wherein the molar ratio of the diol component to the diacid component is from about 0.5 to about 4.

12. The method of claim 1 wherein the reaction mixture further comprises an antimony containing component.

13. The method of claim 12 wherein the reaction mixture comprises zinc acetate or manganese acetate, the antimony containing component comprises antimony trioxide, and the phosphorus containing component comprises phosphoric acid.

14. The method of claim 13 wherein the metal containing component is zinc acetate present in an amount from about 10 to about 200 ppm.

15. The method of claim 13 wherein the antimony trioxide is present in an amount from about 20 to about 500 ppm.

16. The method of claim 13 wherein the phosphoric acid is present in an amount from about 5 to about 200 ppm.

17. The method of claim 1 further comprising one or more components selected from the group consisting of an iron containing compound, a toner, a cobalt containing compound, and mixtures thereof.

18. The method of claim 1 wherein said alkoxylated moiety represented by the formula —$(CHR_{13}CHR_{14}O)_m$— is selected from the group consisting of ethylene oxide residues, propylene oxide residues, or residues of both, and m is less than about 50.

19. The method of claim 18 wherein m is less than 8.

20. The method of claim 18 wherein m is from 1–3.

21. A method of incorporating a light absorber into a polyester resin, the method comprising:

a) forming a reaction mixture substantially free of a titanium containing ester exchange catalyst compound comprising combining:

a diol, a diacid component comprising dicarboxylic acids in a polycondensation reaction system comprising a series of reaction chambers each designatable as reaction chamber $RC^i$ having a first reaction chamber designatable as reaction chamber $RC^1$, a last reaction chamber designatable as reaction chamber $RC^k$, and one or more intermediate reaction chambers b) successively polymerizing the reaction mixture in the multi-chamber polycondensation reaction system wherein the reaction system is operated in series to produce a product designatable as product $P^i$ from reaction chamber $RC^i$ which is transportable to reaction chamber $RC^{i+1}$ by a conduit designatable as conduit $C^i$ connecting reaction chamber $RC^i$ to a reaction chamber $RC^{i+1}$; and c) adding the light absorber to reaction product $P^i$ as it is transported from reaction chamber $RC^i$ to reaction chamber $RC^{i+1}$, wherein i and k are integers and k is the total number of reaction chambers, wherein said light absorbing compound is selected from the group consisting of compounds having have the formulae:

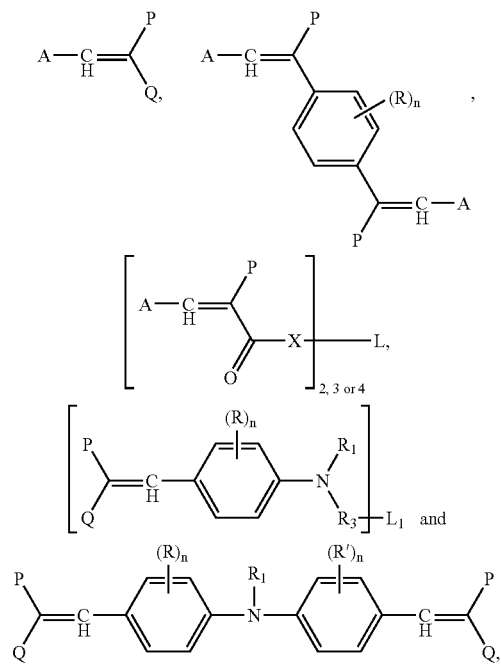

wherein:

A is conjugated with the attached double bond and is selected from the group consisting of nitrogen containing moieties having the following formulae:

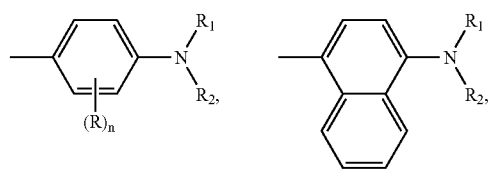

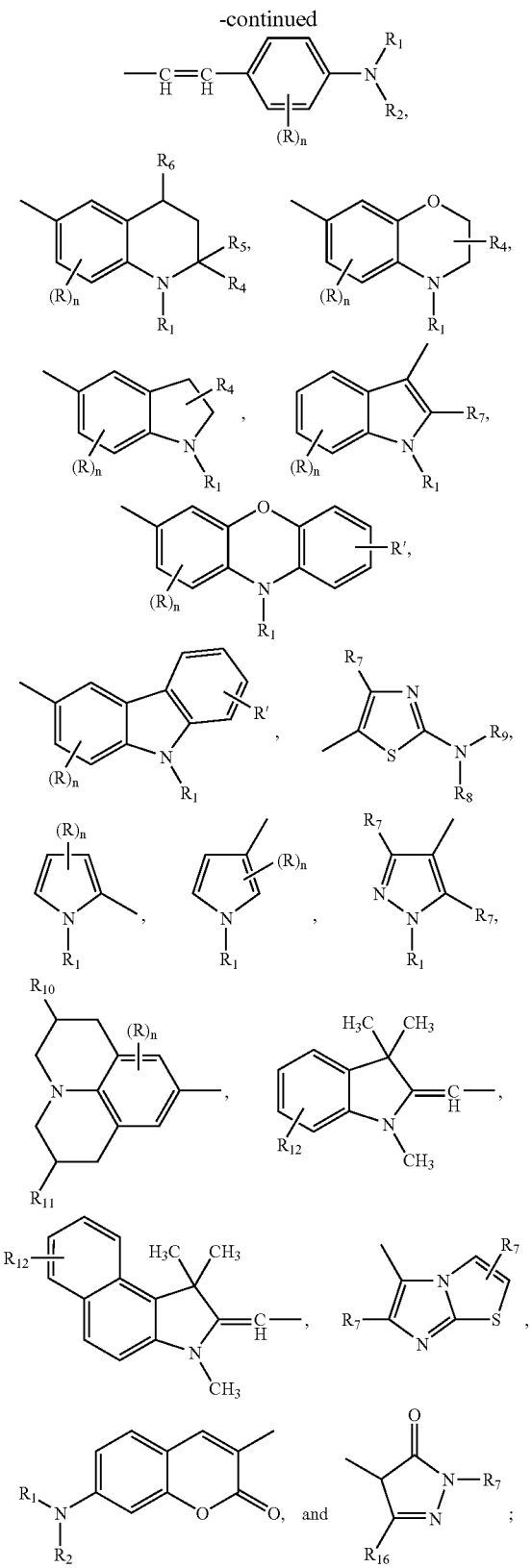

R and R' are independently selected from the group consisting of hydrogen, $C_1$–$C_6$-alkyl, $C_1$–$C_6$-alkoxy and halogen;

n is 1 or 2;

R1 is selected from the group consisting of C$_3$–C$_8$cycloalkyl, C$_3$–C$_8$-alkenyl, aryl, C$_1$–C$_{12}$-alkyl, substituted C$_1$–C$_{12}$-alkyl, and —(CHR$_{13}$CHR$_{14}$O)$_m$—R$_{15}$, wherein m is an integer from 1 to about 100; and R$_2$ is selected from the group consisting of C$_3$–C$_8$cycloalkyl, C$_3$–C$_8$-alkenyl, aryl, C$_1$–C$_{12}$-alkyl, substituted C$_1$–C$_{12}$-alkyl, —(CHR$_{13}$CHR$_{14}$O)$_m$—R$_{15}$, wherein m is an integer from 1 to about 100, and an acyl group selected from —COR$_{16}$, —CO$_2$R$_{16}$, —CONHR$_{16}$— and —SO$_2$R$_{16}$, with the provision that when R$_2$ is an acyl group R$_1$ may be hydrogen; or R$_1$ and R$_2$ can be combined with the nitrogen atom to which they are attached to make cyclic structures selected from the group consisting of pyrrolidino, piperidino, piperazino, morpholino, thiomorpholino, thiomorpholino-S,S-dioxide, succinimido, and phthalimido;

R$_3$ is selected from the group consisting of C$_1$–C$_6$-alkylene, and —(CHR$_{13}$CHR$_{14}$O)$_m$—CHR$_{13}$CHR$_{14}$—, wherein m is an integer from 1 to about 100;

R$_4$, R$_5$ and R$_6$ are independently selected from the group consisting of hydrogen and C$_1$–C$_6$-alkyl;

R$_7$ is selected from the group consisting of hydrogen, C$_1$–C$_6$-alkyl and aryl;

R$_8$ and R$_9$ are independently selected from the group consisting of C$_1$–C$_{12}$-alkyl, substituted C$_1$–C$_{12}$-alkyl, aryl, C$_3$–C$_8$-cycloalkyl, and C$_3$–C$_8$-alkenyl; or R$_8$ and R$_9$ can be combined with the nitrogen atom to which they are attached to produce cyclic structures selected from the group consisting of pyrrolidino, piperidino and morpholino;

R$_{10}$ and R$_{11}$ are independently selected from the group consisting of hydrogen, halogen, C$_1$–C$_6$-akyl, hydroxyl and C$_1$–C$_6$-alkanoyloxy;

R$_{12}$ is selected from the group consisting of carboxy, C$_1$–C$_6$-alkoxycarbonyl and (R)$_n$;

R$_{13}$ and R$_{14}$ are independently selected from the group consisting of hydrogen and C$_1$–C$_6$-alkyl;

R$_{15}$ is selected from the group consisting of hydrogen, aryl, C$_1$–C$_{12}$-alkyl, and C$_1$–C$_6$-alkanoyloxy;

R$_{16}$ is selected from the group consisting of C$_1$–C$_6$-alkyl, C$_3$–C$_8$-alkenyl, aryl, and C$_3$–C$_8$-cycloalkyl;

X is selected from the group consisting of —O—, —NH and —N(R$_{16}$)—;

L is a di, tri or tetravalent linking group;

L$_1$ is selected from the group consisting of a direct single bond or a divalent linking group;

P and Q are independently selected from the group consisting of cyano, —COR$_{16}$, —CO$_2$R$_{16}$, —CON(R$_{17}$)R$_{18}$, aryl, heteroaryl, and —SO$_2$R$_{16}$; or P and Q can be combined with the conjugated double-bonded carbon atom to which they are attached to produce divalent radicals selected from the group consisting of the following formulae.

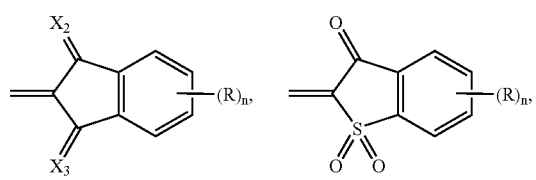

-continued

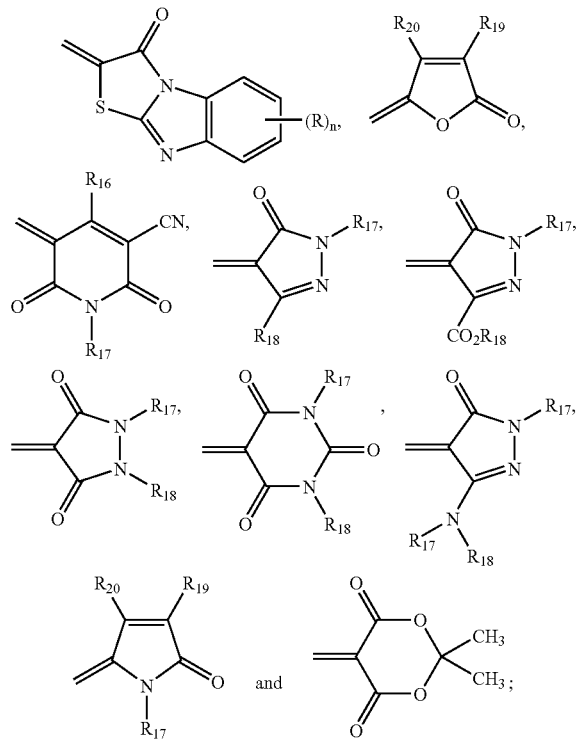

wherein:

R$_{17}$ and R$_{18}$ are independently selected from the group consisting of hydrogen, C$_1$–C$_6$-alkyl, aryl C$_3$–C$_8$-cycloalkyl, and C$_3$–C$_8$alkenyl;

R$_{19}$ is selected from the group consisting of cyano, carboxy, —CO$_2$R$_{16}$, —CON(R$_{17}$)R$_{18}$ and

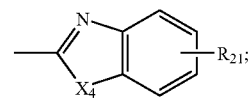

R$_{20}$ is selected from the group consisting of aryl and heteroaryl;

X$_2$ and X$_3$ are independently selected from the group consisting of oxygen and =C(CN)CN;

X$_4$ is selected from the group consisting of —O—, —S—, —N(R$_{17}$)—;

R$_{21}$ is selected from the group consisting of hydrogen and up to two groups selected from C$_1$–C$_6$-alkyl, C$_1$–C$_6$-alkoxy, halogen, carboxy, cyano and —CO$_2$R$_{16}$, with the provision that Q may be hydrogen when P is selected from the group consisting of -carboxy, —CO$_2$R$_{16}$, —C(R$_{20}$)=C(CN)CN and

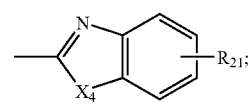

and wherein the light absorbing compound includes a polyester reactive group.

22. The method of claim 21 wherein $R_1$ and $R_2$ are combined to make cyclic structures selected from the group consisting of pyrrolidino, piperidino, piperazino, morpholino, thiomorpholino, thiomorpholino-S,S-dioxide, succinimide, and phthalimido.

23. The method of claim 21 wherein P and Q combine with the conjugated double-bonded carbon atom to which they are attached to produce the cyclic divalent radicals selected from the group consisting of the following formulae:

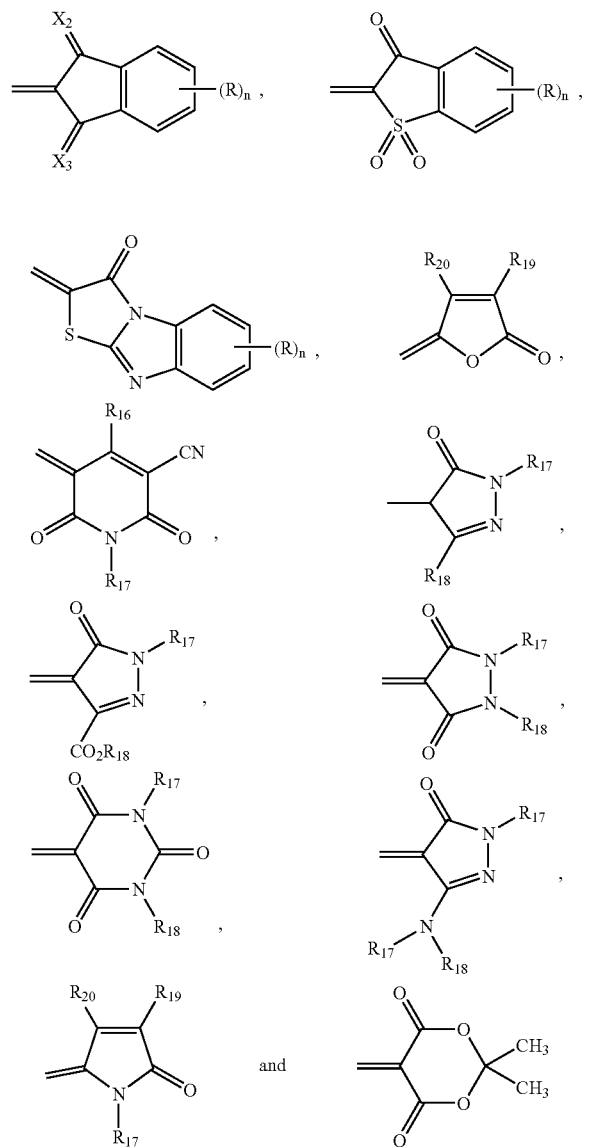

wherein:

$R_{17}$ and $R_{18}$ are independently selected from the group consisting of hydrogen, $C_1$–$C_6$-alkyl, aryl $C_3$–$C_8$-cycloalkyl, and $C_3$–$C_8$-alkenyl;

$R_{19}$ is selected from the group consisting of cyano, carboxy, —$CO_2R_{16}$, —$CON(R_{17})R_{18}$ and

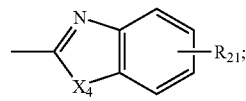

$R_{20}$ is selected from the group consisting of aryl and heteroaryl;

$X_2$ and $X_3$ are independently selected from the group consisting of oxygen and =C(CN)CN;

$X_4$ is selected from the group consisting of —O—, —S—, —N($R_{17}$)—;

$R_{21}$ is selected from the group consisting of hydrogen and up to two groups selected from $C_1$–$C_6$-alkyl, $C_1$–$C_6$-alkoxy, halogen, carboxy, cyano and —$CO_2R_{16}$, with the provision that Q may be hydrogen when P is selected from the group consisting of -carboxy, —$CO_2R_{16}$, —$C(R_{20})$=C(CN)CN and

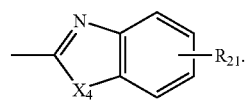

24. The method of claim 21 wherein the light absorber is added to reaction product $p^{k-2}$ while reaction product $p^{k-2}$ is transported between reaction chamber $RC^{k-2}$ and reaction chamber $RC^{k-1}$.

25. The method of claim 21 wherein from 0.0 to 2 ppm titanium containing ester exchange catalyst compound, based on the amount of titanium metal, is added to the reaction mixture.

26. The method of claim 21 wherein the diol component is selected from the group consisting of ethylene glycol; 1,4-cyclohexanedimethanol; 1,2-propanediol; 1,3-propanediol; 1,4-butanediol; 2,2-dimethyl-1,3-propanediol; 1,6-hexanediol; 1,2-cyclohexanediol; 1,4-cyclohexanediol; 1,2-cyclohexanedimethanol; 1,3-cyclohexanedimethanol; 2,2,4,4-tetramethyl-1,3-cyclobutane diol; X,8-bis(hydroxymethyl)tricyclo-[5.2.1.0]-decane, wherein X represents 3, 4, or 5; diols containing one or more oxygen atoms in a chain and mixtures thereof.

27. The method of claim 21 wherein the diacid component comprises a component selected from the groups consisting of terephthalic acid, isophthalic acid, naphthalene dicarboxylic acid, 1,4-cyclohexanedicarboxylic acid, 1,3-cyclohexanedicarboxylic acid, succinic acid, glutaric acid, adipic acid, sebacic acid, 1,12-dodecanedioic acid, and mixtures thereof.

28. The method of claim 27 wherein the diacid component comprises terephthalic acid.

29. The method of claim 28 wherein the molar ratio of the diol component to the diacid component is from about 0.5 to about 4.

30. The method of claim 21 wherein the reaction mixture further comprises an antimony containing component.

31. The method of claim 30 wherein the reaction mixture comprises zinc acetate or manganese acetate, the antimony containing component comprises antimony trioxide, and the phosphorus containing component comprises phosphoric acid.

32. The method of claim 31 wherein the metal containing component is zinc acetate present in an amount from about 10 to about 200 ppm.

33. The method of claim 31 wherein the antimony trioxide is present in an amount from about 20 to about 500 ppm.

34. The method of claim 31 wherein the phosphoric acid is present in an amount from about 5 to about 200 ppm.

35. The method of claim 21 further comprising one or more components selected from the group consisting an iron containing compound, a toner, a cobalt containing compound, and mixtures thereof.

36. The method of claim 21, wherein 0.0 ppm titanium containing ester exchange catalyst compound is added to the reaction mixture.

37. The method of claim 22 wherein said alkoxylated moiety represented by the formula —$(CHR^1CHR^{11}O—)_m$ is selected from the group consisting of ethylene oxide residues, propylene oxide residues, or residues of both, and m is less than about 50.

38. The method of claim 37 wherein m is less than 8.

39. The method of claim 37 wherein m is from 1-3.

* * * * *

UNITED STATES PATENT AND TRADEMARK OFFICE
CERTIFICATE OF CORRECTION

PATENT NO. : 7,282,555 B2
APPLICATION NO. : 10/855919
DATED : October 16, 2007
INVENTOR(S) : Weaver et al.

It is certified that error appears in the above-identified patent and that said Letters Patent is hereby corrected as shown below:

Column 28, Line 5, Claim 37 "$(CHR^1CHR^{11}O-)_m$" should read -- $(CHR_{13}CHR_{14}O)_m$ --

Signed and Sealed this

Eleventh Day of November, 2008

JON W. DUDAS
*Director of the United States Patent and Trademark Office*